United States Patent [19]

Sullivan

[11] Patent Number: 5,224,862
[45] Date of Patent: Jul. 6, 1993

[54] INITIAL AND REINFORCEMENT LEARNING UNIT

[75] Inventor: Robert L. Sullivan, North Caldwell, N.J.

[73] Assignee: The Way of Peach, Inc., New Fairfield, Conn.

[21] Appl. No.: 867,370

[22] Filed: Apr. 13, 1992

[51] Int. Cl.$^5$ .............. G09B 19/22; G09B 19/00; A63F 3/00
[52] U.S. Cl. ................... 434/129; 273/243; 273/249; 434/245
[58] Field of Search ............ 434/128, 129, 245; 273/243, 249, 256

[56] References Cited

U.S. PATENT DOCUMENTS

| | | | |
|---|---|---|---|
| 4,121,823 | 10/1978 | McBride | 293/243 X |
| 4,900,032 | 2/1990 | Erickson et al. | 273/243 |
| 4,907,808 | 3/1990 | Turner et al. | 273/240 |
| 5,042,816 | 8/1991 | Davis et al. | 273/243 |

FOREIGN PATENT DOCUMENTS

| | | | |
|---|---|---|---|
| 3210011 | 9/1983 | Fed. Rep. of Germany | 273/256 |
| 801964 | 6/1957 | United Kingdom | 273/243 |
| 2189156 | 10/1987 | United Kingdom | 273/254 |

OTHER PUBLICATIONS

*Trivial Pursuit, Master Game-Rules of Play*, 6 pages, copyright 1981.

Primary Examiner—Gene Mancene
Assistant Examiner—L. Thomas
Attorney, Agent, or Firm—Lackenbach Siegel Marzullo Aronson & Greenspan

[57] ABSTRACT

A religious learning unit for initial teaching and reinforcement teaching of biblical knowledge and principles in a competitive, but supportive game environment. The unit consists of a game board having four major quadrants or focus areas bounded by contiguous perimeter spaces separated by bisecting perpendicular paths also formed of contiguous spaces. Various spaces around the board are designated as pieces of the Armor of God. The object of the game is to advance along the spaces, collect all the pieces of armor and answer a final question. In order to advance, each player must answer an appropriate question listed on a card. The question deals with the Bible.

The first player to collect all six pieces of armor is allowed to proceed to the center square and to answer the last question. Whether it is answered correctly or incorrectly, as soon as an answer is given the game is over.

14 Claims, 3 Drawing Sheets

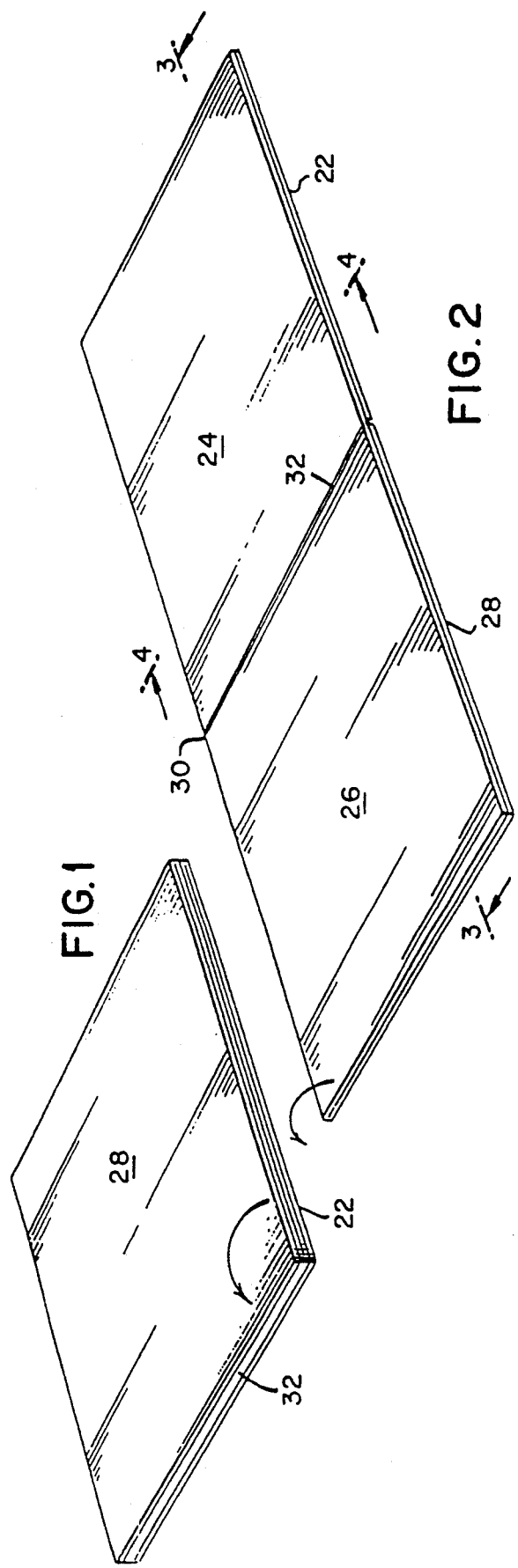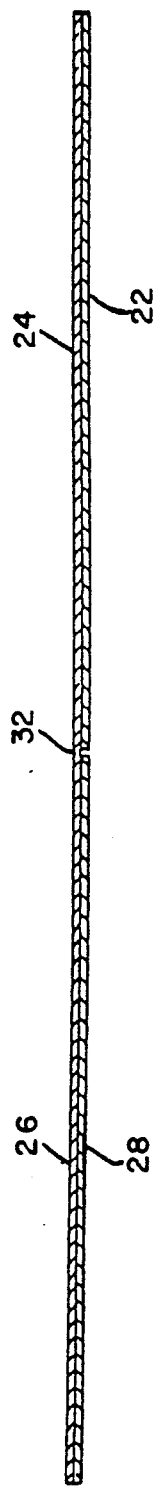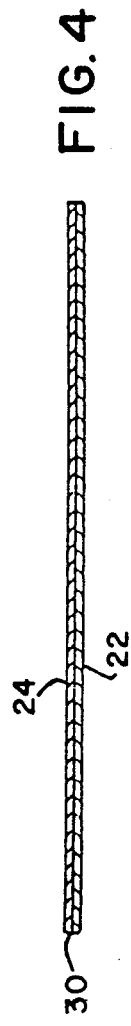

INITIAL AND REINFORCEMENT LEARNING UNIT

FIELD OF THE INVENTION

The present invention relates to learning units which impart initial and reinforcement knowledge in a competitive game environment, and more specifically are directed to teaching Biblical knowledge and principles in a competitive, but supportive game environment.

BACKGROUND OF THE INVENTION

Educational game environments for teaching varying types of subject matter are well known. In the past, a popular educational device had been flash cards. An early example of a patent utilizing such cards is U.S. Pat. No. 1,638,433. This card sets out questions on one side. It includes on the other side a key card indicating what section of the Bible or what was the appropriate answer to the question asked on the face of the card.

More typical of the next level of games is U.S. Pat. No. 1,562,025, which is similar to Chinese checkers in that an attempt is made to move from one position on the board to another with an attempt to intersect and prevent that movement by the opposing player. The game is won by accumulation of points, which is somewhat similar to the accumulation of the pieces of armor in the present invention.

U.S. Pat. No. 4,441,718 involves movement in contiguous spaces but does not require educational knowledge in order to complete the moves.

U.S. Pat. No. 4,121,823 discloses a game board with contiguous spaces, and question and answer cards that affect play and movement, all in a religious subject matter environment. However, the concept of collecting various pieces representing the armor of God in a competitive, yet supportive game environment, is not present.

Accordingly it is among the objects of the present invention to provide an initial teaching and reinforcement teaching learning unit which is not only educational but which is also entertaining.

Still yet a further object of the present invention is to provide a learning unit of the character described which will be stimulating even when not being played in a competitive environment.

Still yet another object of the present invention is to provide a learning unit which allows for competition between two or more players.

Still yet another object of the present invention is to provide a device which will be economical to manufacture and yet will be durable and remain topical to a high degree for an extended period of use.

SUMMARY OF THE INVENTION

The present invention is directed to a religious learning unit employing a game environment. It is specifically designed to teach religious subject matter to people who are not knowledgeable. It also is intended to reinforce the knowledge of those people who already have a certain amount of religious training. The unit includes a game board, player markers, a chance die, and armor cards. Finally, there are provided a plurality of question cards containing six questions and movement instructions, as defined below.

The game board consists of a perimeter with a plurality of contiguous spaces, the board being divided by two perpendicular bisecting columns to form four areas or quadrants.

Each quadrant has additional contiguous spaces which may be accessed by one or more of the perimeter spaces. At the central bisecting space on the board, known as "Love", the player markers are initially placed. The game begins at this point. The die is thrown and the parties move respectively off the central portion towards the perimeter spaces. Located throughout the various spaces are seven "Armor of God" spaces. The purpose of the game is to collect six pieces of the "Armor of God". There are "Blessing" spaces for immediate movement to the armor space and "Pruning of the Vine" spaces used in connection with specific instructions on the question and answer cards located under the vine. The number on the die when it is thrown designates the number of spaces to move and which question on the question card is to be answered.

When one player has accumulated the six pieces of the "Armor of God", he or she is considered the initial winner. The player then moves back to the center square to answer the last question. The answer is the last, whether answered correctly or incorrectly, then the game is over. At this time each player knows how many cards he or she has received. Thus the normal competitiveness associated with most games is muted, well within the philosophical teaching of the Bible. However, there is still an incentive to answer the questions.

The above description, as well as further objects and advantages of the present invention will be more fully appreciated with reference to the following detailed description of a preferred, but nonetheless illustrative embodiment of the invention, when taken in conjunction with the following drawings, wherein;

FIG. 1 is a front prospective view of the game board folded into its most compact position;

FIG. 2 is another front prospective view similar to FIG. 1 but with the board partially unfolded;

FIG. 3 is a sectional view taken along the line 3—3 of FIG. 2;

FIG. 4 is a cross sectional view taken along the line of 4—4 of FIG. 3;

DETAILED DESCRIPTION OF THE INVENTION

Figure 5:
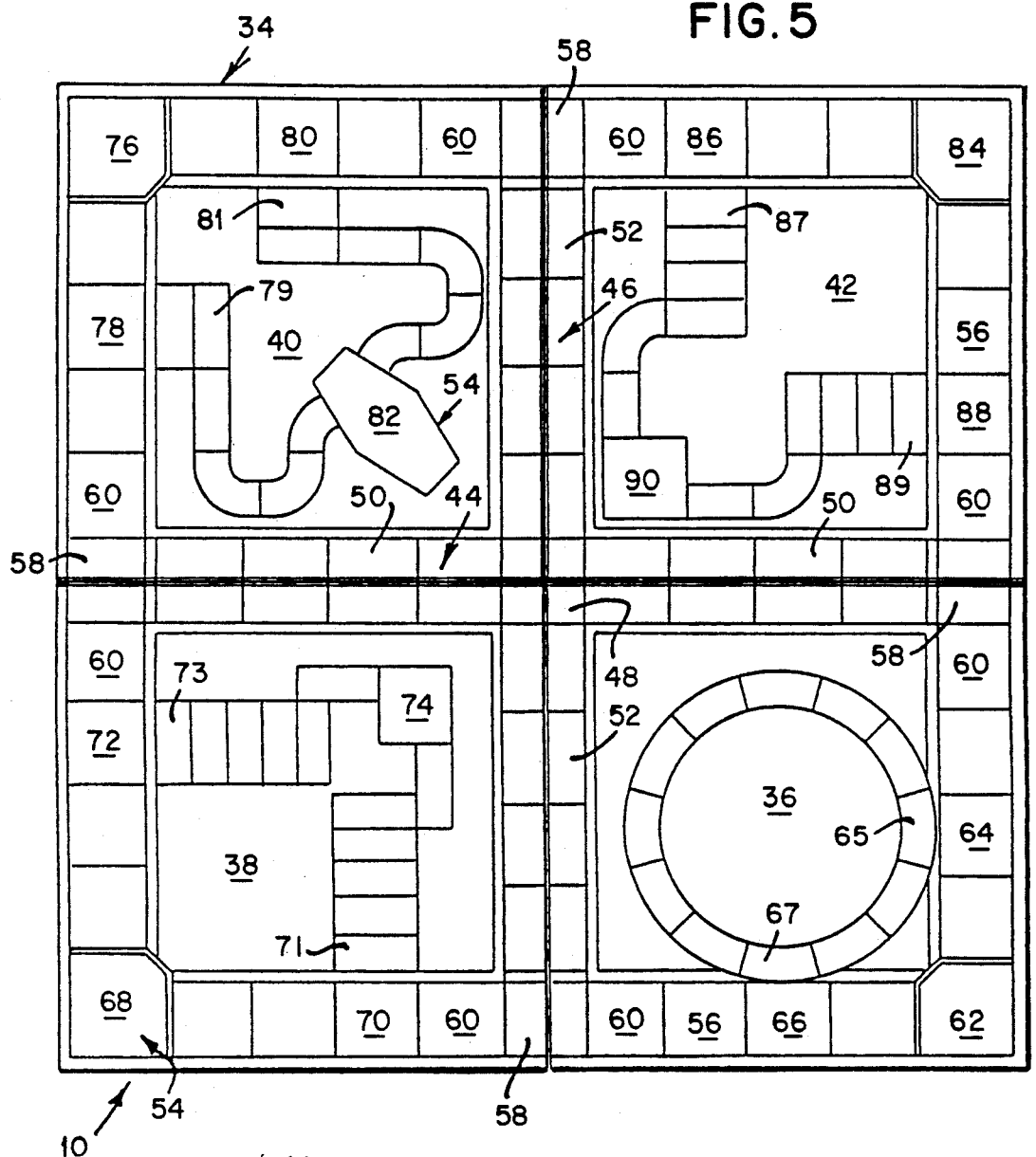
FIG. 5 is a plan view of the board shown in a completely open condition, exposing the playing surface.
Figure 6:
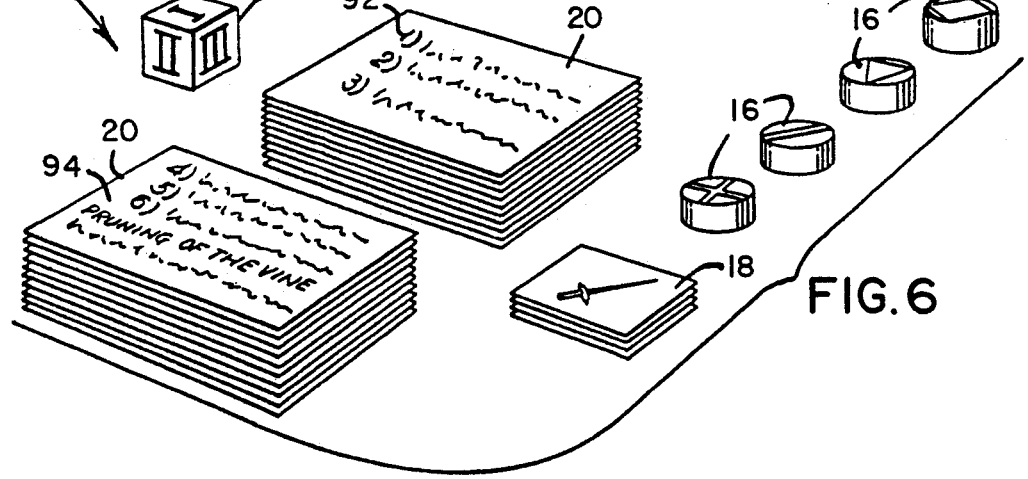
FIG. 6 is a perspective view of the playing components, including the chance die, the player markers, (stones) the armor cards, and the top and bottom faces of the question cards.
Figures 7, 8:
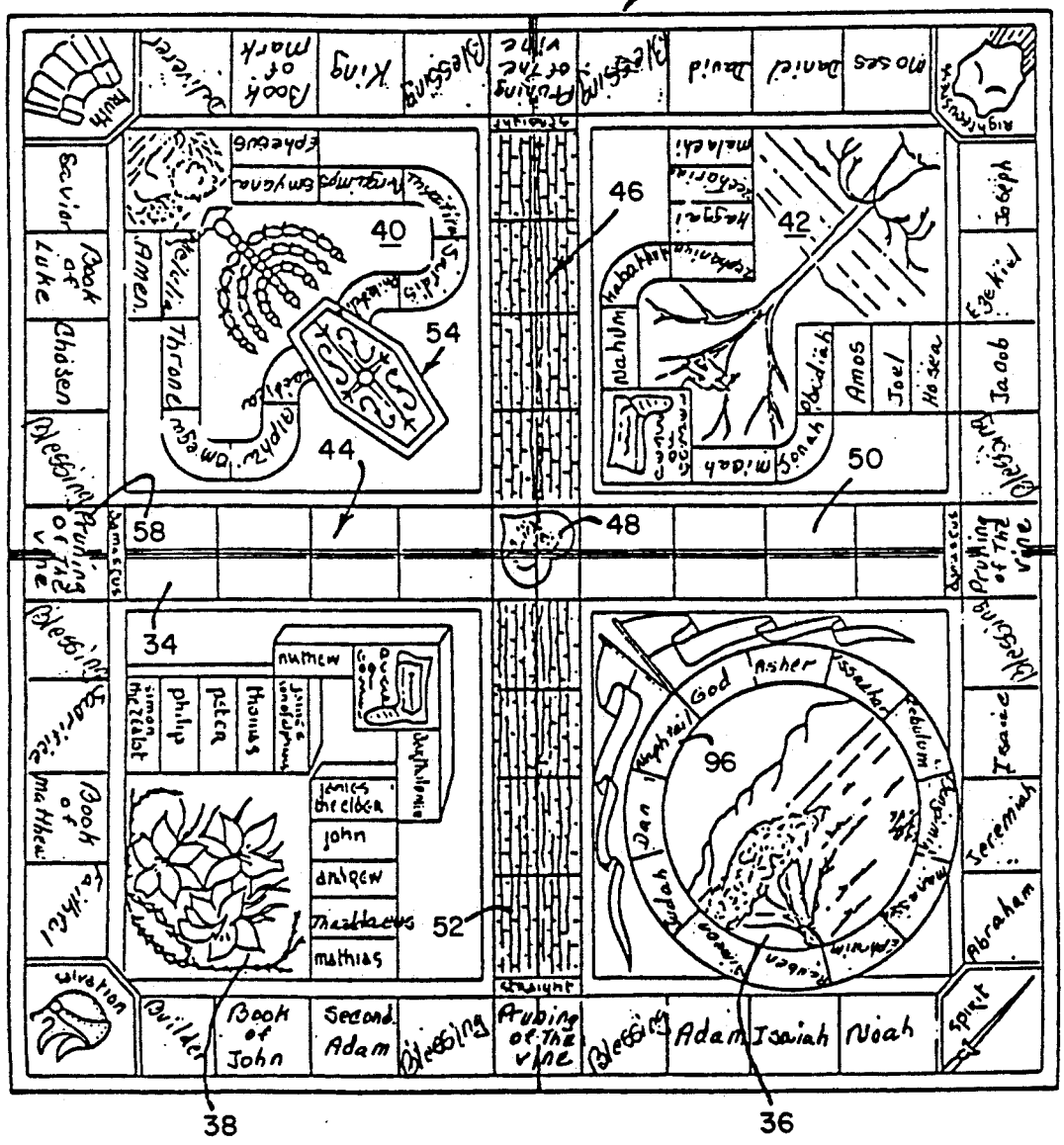
FIG. 7 is a detailed plan view of the board as used for a Bible game.
FIG. 8 is side elevational view of FIG. 7.

Referring to the drawings, and more particularly to FIGS. 5–7 there is shown a religious learning unit 10 which includes a game board 12, a chance die 14, player markers 16, armor cards 18 and question cards 20.

Turning to FIGS. 1–4, there is shown a foldable game board which includes a first section 22, a second section 24, a third section 26, and a fourth section 28. The second and third sections are joined to the first and fourth sections along a full length centerfold 30, and sections 24 and 26 are joined along a half length fold 32. Thus it is obvious that in the normal completely folded or shipping or storage position, the board assumes the configuration shown in FIG. 1. When the board is opened, it is rotated one hundred and eighty degrees along the fold line 32 to assume the configuration shown in FIG. 2. The board is then rotated counterclockwise in accordance with the arrow shown in FIG. 2 and along the fold line 30 to assume the configuration as shown in FIG. 5 with the playing side 34 exposed.

The board is divided into four quadrants and commencing from the lower right in a clockwise direction, the first quadrant 36 contains the names of the twelve tribes of Israel. The second quadrant 38 contains the names of the twelve apostles. The third quadrant 40 contains the names of the seven churches taken from the Book of Revelation and five other words from the same book. The fourth quadrant 42 contains the names of the old testament minor prophets. The quadrants are defined by a plurality of perpendicular bisecting spaces. The first group 44 extends transversely across the board and is identified as the "Road to Damascus." The second group 46 is identified as the "Street called Straight". The central bisecting space 48 is identified as "Love" and extending transversely in both directions from the space are the "Damascus" spaces 50 and extending vertically in both directions are the "Street" spaces 52.

The key spaces 54 in the game are identified as "Armor of God". They will be described in further detail below.

The quadrants are bounded on all sides of the board by a plurality of contiguous perimeter spaces 56, the four corners of which are armor spaces. The perimeter spaces leading directly off the "Road to Damascus" spaces and the "Street called Straight" spaces 44, 46, are identified as "Pruning of the Vine" spaces 58. On either side of the four "Pruning of the Vine" spaces are eight "Blessing" spaces 60.

With respect to the first quadrant containing the tribes of Israel, the armor spaces 54 located in the corner within this quadrant is the "Sword" space 62. Access to or egress from the contiguous spaces containing the twelve tribes of Israel is through either the "Isaiah" space 64 contiguous to the "Reuben" space 65. The other entrance or exit is at the "Jeremiah" space 66 contiguous to the "Benjamin" space 67.

Turning to the second quadrant containing the apostles, the armor space in the perimeter corner is the "Helmet" space 68. Access to the contiguous spaces within this quadrant is gained through the "Last Adam" perimeter space 70 contiguous to the "Matthias" space 71. Access or egress is also possible through the "Sacrifice" perimeter space 72 contiguous to the "Simon the Zealot" space 73. At the midpoint of the contiguous spaces carrying the names of the apostles, is a "Shoe" armor space 74.

Turning to the third quadrant, the armor space in the perimeter corner is the "Girdle" space 76. Access to the contiguous spaces within the quadrant itself may be made from the "Book of Luke" perimeter space 78 contiguous to the "Amen" space 79 or the "Book of Mark" perimeter space 80 contiguous to the "Ephesus" space 81. The inner quadrant spaces have at their midpoint another armor space which is the "Shield" space 82.

Finally, the fourth quadrant has at its perimeter corner the "Breastplate" armor space 84. Access to the contiguous spaces within the quadrant may be made from either the "David" perimeter space 86 contiguous to the "Malachi" space 87 or by the "Jacob" perimeter space 88 contiguous to the "Hosea" space 89. Both of the contiguous space paths within the quadrant lead to a second "Shoe" armor space 90.

Before commencing a discussion of the rules of the game, it would be helpful to consider the ultimate purpose of this game, which is spiritual growth. It is intended to teach the Bible to newcomers, and to reinforce the knowledge of people who already have a familiarity with the Bible. While there can be a player who is designated as a winner, the competitive environment is muted. In fact, the whole idea of the game encourages the making of all the player winners. Thus, the ultimate aim of teaching the Bible is accomplished.

The game may be played by two players and more. However, more than six players makes movement and enjoyment of the game somewhat awkward. Of course, a single player can use the game to increase Biblical knowledge.

Each of the players selects a player marker (stone) 16 and 20 places it in the "Love" space 48, the starting point for the game. The first player then rolls the chance die 14 which will result in a number from one to six. The player then moves his or her piece in a single contiguous direction. The direction can be changed with each roll, but each roll requires movement in a single direction.

The movement is in any direction from the center space 48 along either direction of the "Street called Straight" spaces 52 or the "Road to Damascus" spaces 50.

After moving the number of spaces indicated by the die, the player selects a question card and has to answer the question indicated by the number of the die. There are six questions on a card. If the question is answered correctly, then the player can throw the die and move once again.

The object is to land on the individual armor spaces 54, answering the associated questions correctly, and collecting the associated armor markers 18 until all the pieces of armor, including one of the two shoes, have been collected. The collection of a piece of armor is indicated by using the armor markers 18. This includes landing directly on the spaces, namely, "Sword" space 62, the "Helmet" space 68, the "Girdle" space 76, the "Breast-plate" space 84, "Shield" space 82 and one of the two "Shoe" spaces 74, 90. The first player to collect the individual pieces of armor, including one of the two "Shoes", is to continue rolling the die and answering questions correctly until he or she gets back to the center square "Love" space 48. At that time the final game question is asked and when answered correctly or incorrectly the game is over.

This develops not only a knowledge of the Bible in a competitive game environment, but provides a further supportive environment since those who did not gain all the pieces of the "Armor of God" are ultimate winners.

There are eight "Blessing" squares 60 which are on the perimeter space rows and are contiguous to the "Street called Straight" spaces 52 and "Road to Damascus" spaces 50. Any player landing on the "Blessing" square is allowed to advance his or her marker to any one of the seven armor squares. Upon landing in the square, if the player answers the question correctly on the question card which matches with the die roll, then that player is awarded the piece of armor in that square.

If the die results in a number that would allow the player to land one of the four "Pruning of the Vine" spaces 58, the player must advance to this space. Once the player lands on the space, the question card is selected and the instructions on the card under the vine are followed. These statements advance the player to various squares on the game board. Once the player is placed on that space, then the player must answer the question corresponding to the number of the die roll that caused the advancement to the "Pruning of the Vine" space 58 initially. If the question is answered correctly, then the player may roll the die again and advance further.

Turning to FIG. 6 there is shown an example of a typical question card 20 having a first surface 92 and a reverse surface 94. In a preferred embodiment there are 3000 questions. There are six questions on the card corresponding to each number on the die. At the top bottom of the reverse side, answer side, is an instruction for use when the player lands on one of the "Pruning of the Vine" spaces. A sample question card is set forth below:

(6) How old was Joshua when he died? a) 90 years b) 100 years c) 110 years d) 120 years. c) 110 years Joshua 24:29.

(5) What book of the Bible comes before Amos? Joel.

(4) "Surely the Lord God does nothing without revealing His secret to His servants the _____. Proph ets Amos 3:7

(3) T/F Jesus said "I am the true vine and my father is the husbandman." True John 15:1

(2) Spell "Kneeling", the position Jesus took while praying in the garden at Gethsemane.

(1) In your opinion what advice would Jesus give to an alcoholic?

Pruning of the Vine Statement—Naphtali

The word with the Pruning of the Vine statement indicates a space on the game board to which the player must move his or her piece. Looking at FIG. 7 Naphtali can be seen in quadrant 36 as space 96.

The invention provides a significant advance in the game board art as a means for teaching knowledge initially, and for reinforcing knowledge which had been learned at a prior time. It is done under a competitive yet supportive environment in a novel and an interesting fashion.

As can be seen, the present invention constitutes a significant advance over the state of the technology. As numerous additions, modifications and constructions can be performed within the scope of the invention, such scope is to be measured by the claims herein.

What is claimed is:

1. A learning unit for initial teaching and reinforcement teaching of desired knowledge in a competitive but supportive game environment, which comprises:
   a) a game board having a perimeter and a plurality of first contiguous spaces extending about said perimeter and said game board having a center;
   b) a plurality of question cards directed to a preselected subject matter, the cards containing a plurality of questions one which is to be answered by a player, the correct answering of which allows the player to move further along the spaces;
   c) at least one of the spaces being specially designated and requiring stopping thereon, correct answering of the question related thereto being necessary to terminate the game;
   d) at least one row of second contiguous spaces passing through the center of said game board and extending to said perimeter to form a plurality of substantially equally sized sectors and connected with said contiguous spaces; and
   e) third contiguous spaces within at least one of said sectors connected to said first contiguous spaces, said third contiguous spaces being arranged within a sector wherein all lines bisecting the board through said center would produce two sides which would be asymmetrical.

2. The invention according to claim 1, the desired knowledge being information concerning the Bible, and said first contiguous spaces being arranged around said perimeter of said game board.

3. The invention according to claim 2 wherein said second contiguous spaces bisect the game board at a perpendicular to said first contiguous spaces and said sectors are in the form of quadrants.

4. The invention according to claim 3, wherein the game board includes at least one quadrant area with said third contiguous spaces within the quadrant and connected to at least one of said first contiguous spaces located within the quadrant.

5. The invention according to claim 4, wherein there are four quadrants on the game board.

6. the invention according to claim 2, wherein the game board includes a second category of spaces, the question card having specific directions for movement to another position on the board should the player land on one of the second category of spaces.

7. The invention according to claim 3, wherein the game board includes a second category of spaces, the question card having specific directions for movement to another position on the board should the player land on one of the second category of spaces.

8. The invention according to claim 2, wherein the game board includes seven specially designated spaces, five of which are unique and two are which are the same the player having to land on and answer questions correctly relating to the five unique spaces and at least one of the two additional spaces 9. The invention according to claim 3, wherein the game board includes seven specially designated spaces, five of which are unique and two of which are the same, the player having to land on and answer questions correctly relating to the five unique spaces and at least one of the two additional spaces.

10. The invention according to claim 5, wherein the game board includes a plurality of designated spaces and a second category of spaces the question card having specific directions for movement to another position on the board should the player land on one of the second category of spaces.

11. The invention according to claim 10, wherein the plurality of designated spaces include five unique spaces and two identical spaces.

12. The invention according to claim 11, wherein the question cards contain six numbered questions and specific movement instructions.

13. The invention according to claim 12, the learning unit including a chance piece containing six sides each containing a different number in order to designate the number of spaces to be moved by the player.

14. The invention according to claim 13, wherein each of the specially designated spaces has a marker designation in order to allow the player to keep count of the specially designated spaces where he has landed and has correctly answered the corresponding question.

* * * * *